Figure 1:
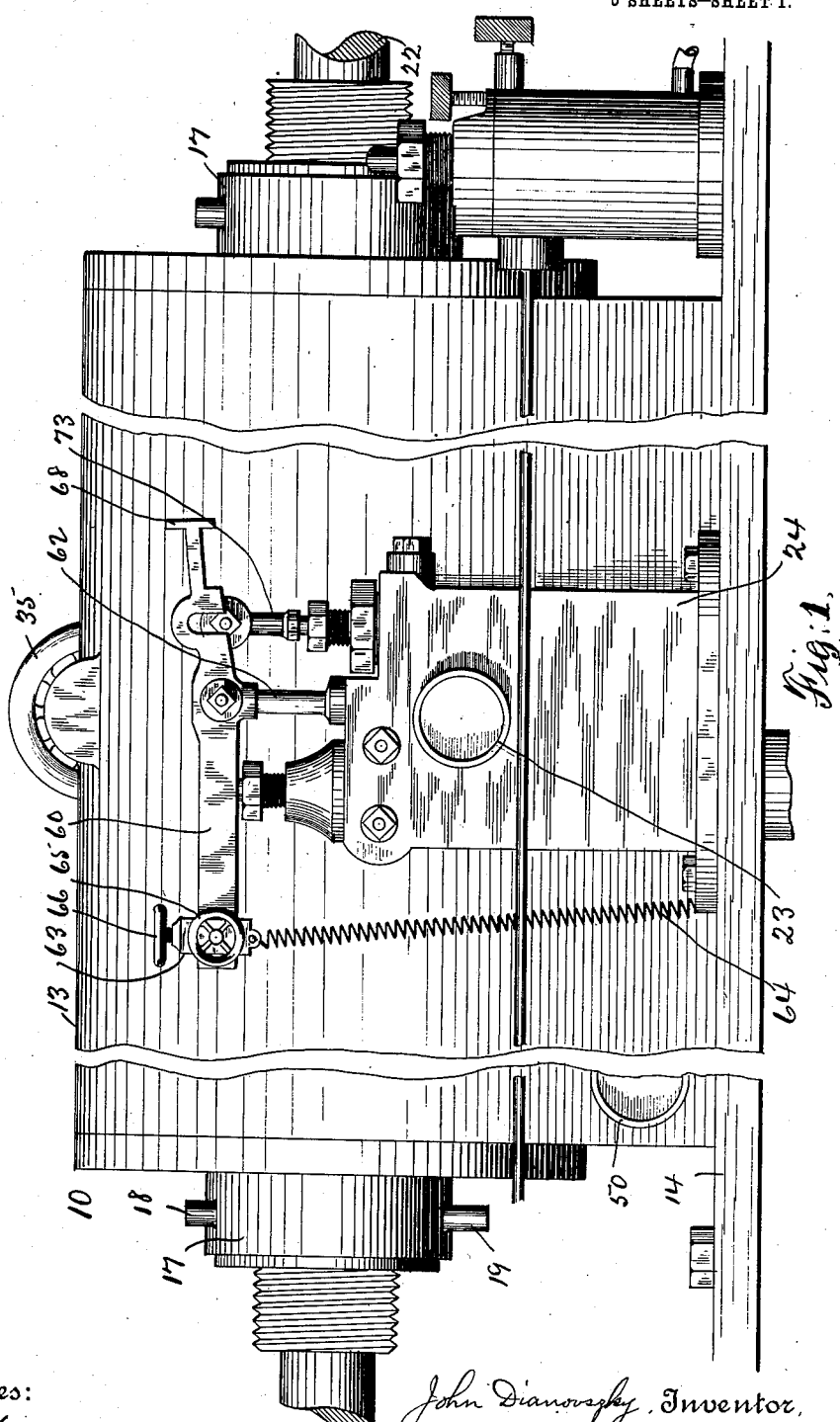

J. DIANOVSZKY.
STEAM TURBINE.
APPLICATION FILED JULY 10, 1912.

1,068,987.

Patented July 29, 1913.
5 SHEETS—SHEET 4.

Witnesses:

John Dianovszky, Inventor,
By his Attorney

J. DIANOVSZKY.
STEAM TURBINE.
APPLICATION FILED JULY 10, 1912.

1,068,987.

Patented July 29, 1913.

5 SHEETS—SHEET 5.

Witnesses
W. J. Tucker
M. G. O'Donnell

John Dianovszky, Inventor.
By his Attorney,
W. B. Hutchinson.

UNITED STATES PATENT OFFICE.

JOHN DIANOVSZKY, OF PASSAIC, NEW JERSEY, ASSIGNOR OF ONE-HALF TO OSWALD A. SCHLEGEL, OF PASSAIC, NEW JERSEY.

STEAM-TURBINE.

1,068,987.  Specification of Letters Patent.  Patented July 29, 1913.

Application filed July 10, 1912. Serial No. 708,699.

*To all whom it may concern:*

Be it known that I, JOHN DIANOVSZKY, of Passaic, Passaic county, New Jersey, have invented a new and useful Improvement in Steam-Turbines, of which the following is a full, clear, and exact description.

My invention relates to improvements in steam turbines, and the object of my invention is to produce a steam turbine which is constructed and arranged so that it will use the steam expansively as well as by impact, and will utilize all the pressure of the steam, so that while the steam may be admitted under high pressure, it will be exhausted under minimum pressure.

My invention also provides for arranging the turbine in the general form of a cylinder, and dividing the operating rings into three banks or divisions located at either end and near the center, so that the machine is well balanced and there is no friction. This is especially true because the steam is admitted near the center of the cylinder, passes through one bank of turbine rings, then returns to the center portion of the machine, passes through the middle bank of operating rings, and then through the third bank of rings at the final end of the cylinder where it is exhausted. This arrangement also serves the purpose of carrying the steam through the central portion of the machine where it is kept highly heated and little subject to condensation.

A further object of my invention is to construct the engine so that all the parts can be easily made and assembled and easily taken apart and repaired.

Further objects of my invention will appear from the description which follows.

Reference is to be had to the accompanying drawings forming a part of this specification, in which similar reference characters indicate corresponding parts in all the views.

Figure 2:
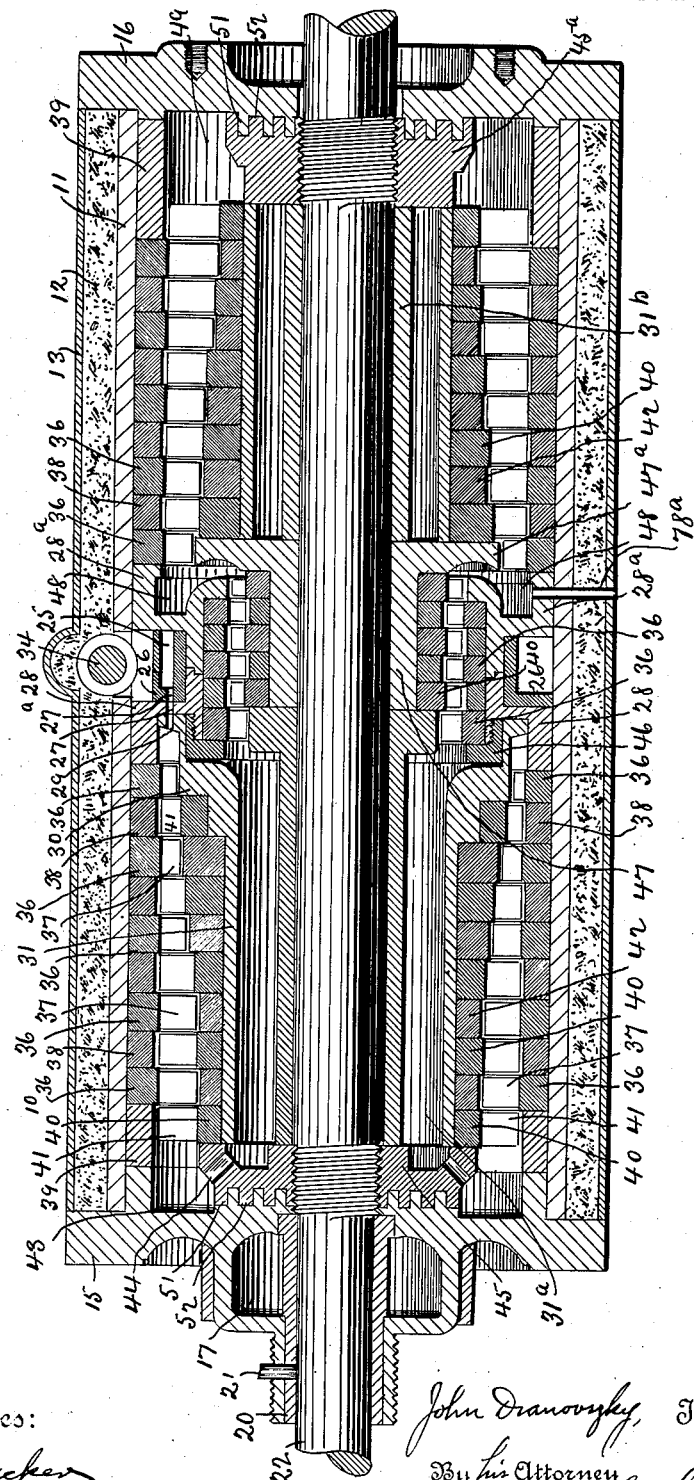
Figure 3:
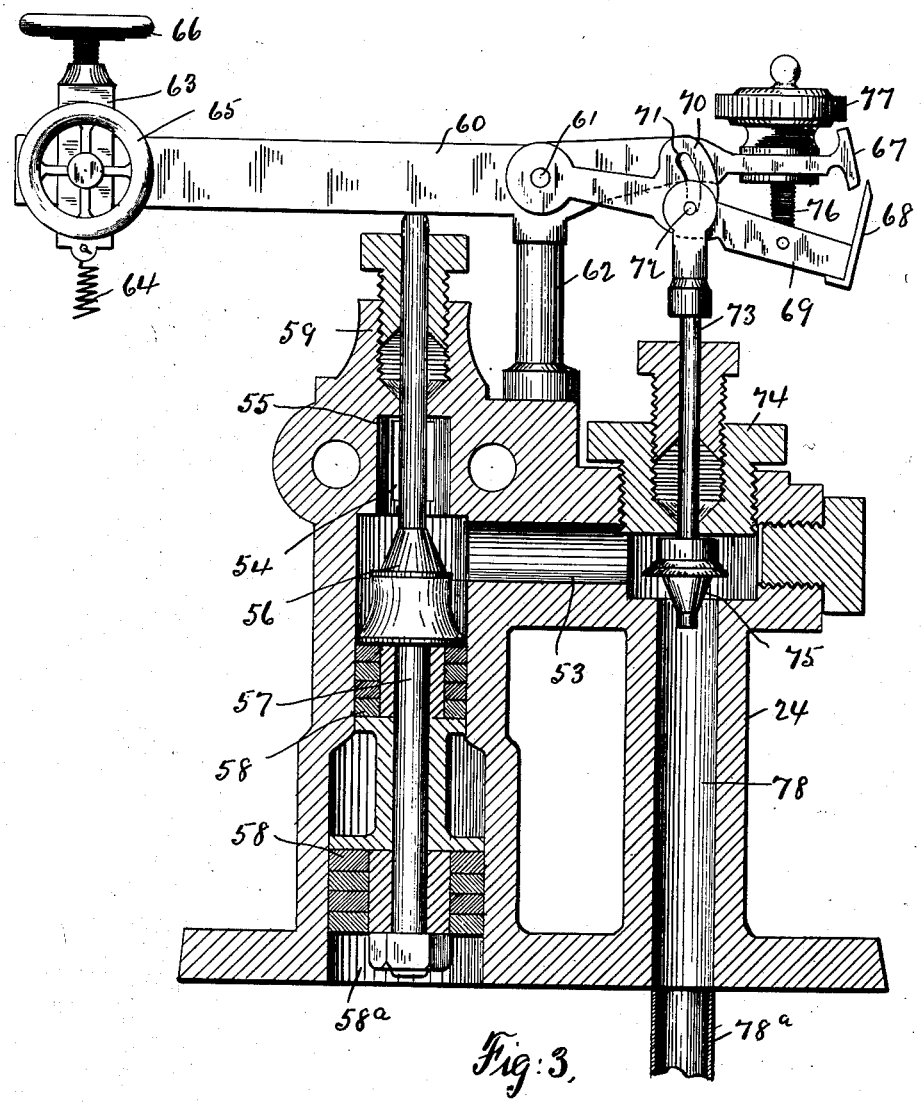
Figure 4:
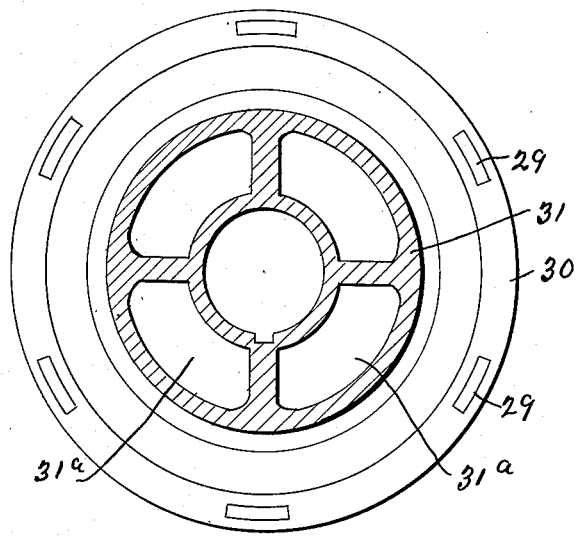
Figure 5:
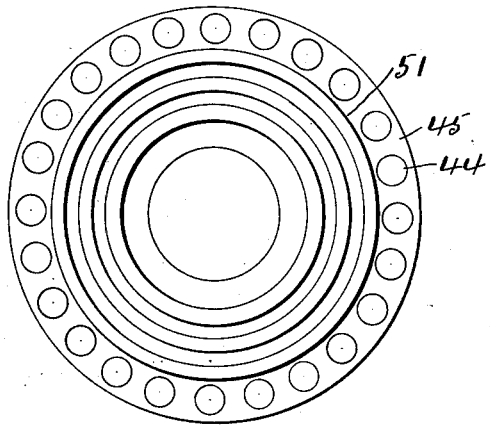
Figure 13:
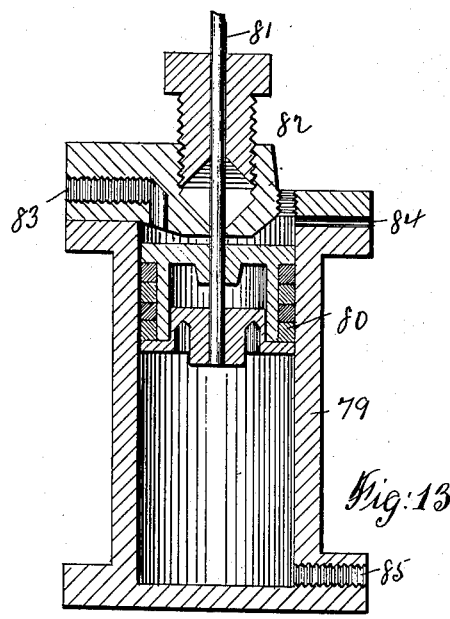
Figure 12:
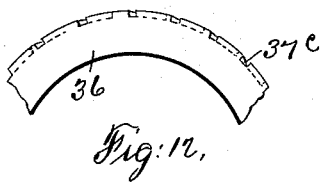
Figure 11:
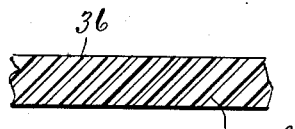
Figure 10:
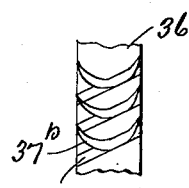
Figure 6:
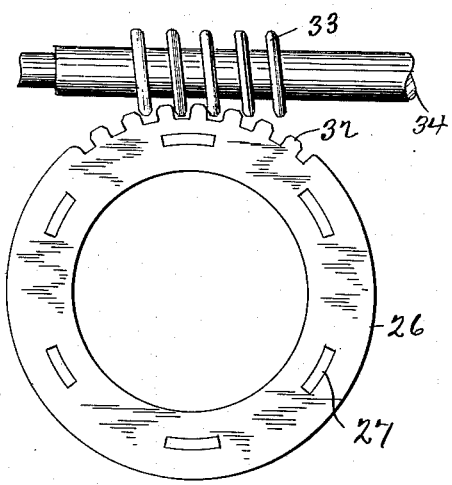
Figure 8:
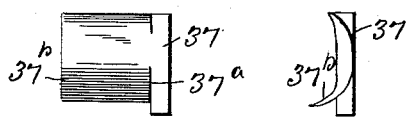
Figure 9:
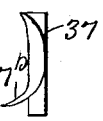
Figure 7:
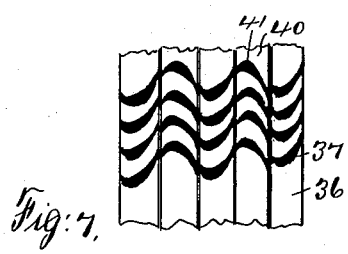

Figure 1 is a broken front elevation of the engine embodying my invention. Fig. 2 is a longitudinal section through the cylinder. Fig. 3 is a vertical cross section of the regulator which controls the steam pressure for the cylinder. Fig. 4 is a cross section through the central collar which has the steam chamber and a flanged dividing ring. Fig. 5 is a detail elevation of one of the nuts at the ends of the cylinder. Fig. 6 is a fragmentary detail view showing the means for regulating the ring valve which controls the steam supply. Fig. 7 is a diagrammatic development of several of the turbine rings showing the arrangement of the blades thereon. Fig. 8 is a detail rear elevation of one of the turbine blades. Fig. 9 is an end view of the blade. Fig. 10 is an edge view of a section of one of the rings with the blades therein. Fig. 11 is an edge view of a blade ring with the rings removed. Fig. 12 is a side elevation of a segment of one of the rings with the blades removed, and Fig. 13 is a vertical section of the oil forcing device to supply oil to the bearings of the turbine.

The turbine is provided with a cylinder 10 having a cylindrical shell 11 which is covered with a suitable packing 12 of asbestos or other material, and this is incased in a cover 13, the whole resting upon a suitable base 14, (see Fig. 1). The cylinder is provided with suitable ends 15 and 16 which are substantially similar, and these are provided with water-jackets 17, only one being shown at the left in Fig. 2, and the water-jacket has a suitable intake and outlet 19. In the cylinder end is also a suitable bearing 20 through which extends an oil duct or pipe 21 for oiling the bearing of the shaft 22, which extends longitudinally through the cylinder. The intake of steam is shown in Fig. 1 at 23, and the steam passes through the pressure regulator 24 in order that even pressure may be obtained, and this pressure regulator will be described later. The steam enters the chamber 25 (see Fig. 2) of the ring valve 26, which at intervals is provided with ports 27ª shown in Figs. 2 and 6, so that the steam passes out through these ports and through the ports 27 of the ring 28 and the ports 29 of the dividing flange 30 to the turbine rings as presently described.

The flange 30 is produced on the inner end of the collar 31 which is keyed to the shaft 22. The ring valve 26 is seated on two abutting rings 28 and 28ª which serve as a bearing for the valve ring, and are driven snugly into the cylinder 11 and are stationary. The ring valve 26 is provided with teeth 32 on its edge, which engage the teeth 33 of a shaft 34, and the latter is provided with a wheel 35 (see Fig. 1) by which it may be turned and the valve rotated. Thus the steam can be admitted in desired quantities through the ports of the valve and to the turbine rings. It will be noticed that the dividing flange 30 of the collar 31 rotates with the shaft 22, and that it will therefore rapidly open and close the ports 27 of the ring collar, thereby preventing a continuous flow of steam, but admitting the steam brokenly, which allows it to expand more freely and work more economically, as the steam works with its full pressure from the ring valve directly to the turbine blades.

The turbine blades are carried by alternating fixed and running rings or wheels, and with dividing or spacing rings between. Referring to Fig. 2, it will be seen that as the steam enters the first bank of turbine rings, it will pass first over the blades 37 of the stationary rings 36, and these rings are spaced apart by spacing rings 38 as the drawings clearly show, and they are held snugly together by the rings or collars 39 at the ends of the cylinder. The running rings 40 are arranged within and alternated with the stationary rings 36, and are provided with blades 41, and the running rings are spaced apart by collars 42. It will be seen, therefore, that the steam as it enters from the ring valve 26 will pass over the blades 37 of a stationary ring 36 and be deflected against the blades 41 of the next running ring 40, thence it will pass through the blades 37 of the next stationary ring, and then through the blades 41 of next running ring, and so on through the several rings of the first bank of running wheels or rings to the chamber 43 at one end of the cylinder, which is shown at the left and in Fig. 2. It will be noticed that the blades are wider as they get farther away from the steam inlet, thus providing for the expansion of the steam. From the chamber 43 the steam passes inward through numerous ports 44 of the nut 45 to the chamber 31$^a$ arranged longitudinally of the collar 31 as shown in Figs. 2 and 4. The nut 45 is screwed to the shaft 22 and assists in holding the several turbine rings in place, and a similar nut 45$^a$ is arranged at the opposite end of the cylinder. These nuts will be more specifically referred to presently.

The steam from the chamber 31$^a$ passes through the ring 46 (see Fig. 2) which is screwed to the ring 28 and serves as a bearing for the flange 30, and then through the second bank of turbine rings and blades, this second bank being centrally disposed in the cylinder, and seated respectively in the inner sides of the rings 28 and 28$^a$, and on the outer side of the collar 47 which is secured to the shaft and provided with a flange 47$^a$.

After passing through the middle bank of turbine rings and blades, the steam enters the chamber 48 formed in the outer end of the ring 28$^a$, and from here the steam passes through the third bank of rings and blades to the exhaust chamber 49, from which the steam passes through the outlet 50 shown in Fig. 1. The chamber 48 has a pipe connection 78$^a$ with the pressure regulator hereinafter referred to, and if desired the chamber can be provided with a ring valve 26 to control the steam passing into the third bank of turbine rings.

The arrangement of the turbine rings and blades in the third bank of rings is precisely like that already explained, and it will be noticed that the blades grow progressively longer as the exhaust chamber is reached, so that by the time the steam has reached the exhaust chamber 49, it will have exerted all its power, and it will be further observed that by having the chamber 31$^a$ near the center of the cylinder, the steam is kept very hot and there is little loss by condensation. The third bank of turbine rings just described is keyed to the shaft or collar 31$^b$ which is fast on the shaft 22, and corresponds to the collar 31 except that it does not carry steam.

The nuts 45 and 45$^a$ serve to tighten the several movable members on the shaft 22, and each nut is provided on its outer end with a series of concentric grooves 51, while the corresponding cylinder head is provided with grooves 52, and the teeth formed between the sets of grooves interlock, that is, a series of teeth are produced as shown in Fig. 5, and this concentric interlocking arrangement serves the double purpose of reducing the vibration in the shaft, and of so breaking up any steam which may pass through the opposed parts as to condense it and leave little chance for any live steam to escape.

The blades 37 and 41 are identical so far as their structure is concerned, but they can be given slightly different shapes if desired, and their arrangement is seen from the diagram in Fig. 7, while the actual structure shows more clearly in Figs. 8 to 10. The blade blank 37 is at one edge left perfectly straight so as to fit in the grooves 37$^c$ of one of the rings 36, and the blade is split partially as shown at 37$^a$ so that the wing 37$^b$ can be turned and made as sharp as desired, that is it can be given as sharp an angle as desired, while the grooves 37$^c$ may also be cut at any degree desirable. This is different from most rings in this respect, and it can be shaped so as to cause the steam to depart sharply from the deflecting blades of the ring 36 to the impact blades of the adjacent ring 41. Moreover by reference to Fig. 10 it will be seen that while the blades can be easily inserted or removed, that each serves to fasten the next, as the curved part 37$^b$ overlaps the straight part 37 of the next adjacent blade.

In order that the turbine may run efficiently, it is necessary to have a substantially steady steam pressure and steam supply, to adapt it to its varying loads. This is provided for by the regulator which I have shown in Fig. 3. The regulator 24 has a steam chamber 53 into which the steam is admitted, and the steam passes out through the port 54 to the turbine. This port 54 is located in the reduced chamber 55 which opens from the chamber 53, and the admission of steam to the chamber 55 is controlled by the conical valve 56 which as it rises will gradually shut off the supply to the chamber and to the port 54. The valve 56 is secured to the piston rod 57 which is actuated by the piston 58 working in the chamber 58ᵃ, and projecting upward and outward through a stuffing box 59. The chamber 58ᵃ is connected to a pump, not shown as it forms no part of this invention, and the pump is driven by the turbine so as to pump air, water, or other liquid or fluid to the chamber 58ᵃ, and it will be seen that the pressure will vary with the speed of the pump and consequently of the turbine. The upper end of the piston rod 57 abuts with a beam 60 which tilts on a pivot 61 supported on a post 62 which rises from the body or casing of the regulator. Near one end of the beam 60 is a slide or saddle 63 to which is attached a counterbalancing spring 64 which connects with the base of the regulator or some convenient abutment. The slide 63 can be moved back and forth on the beam 60, and is fastened by the wheel screws 65 and 66. At its opposite end the beam 60 has a scale 67 which is not shown in detail, as it is like the ordinary graduated scale, and over this moves an indicator 68 carried on the arm 69 which is hung on the pivot 61 above referred to, and is provided with a widened portion 70 having a curved slot 71 therein which receives the pin 72 of the valve rod 73 which moves through the stuffing box 74, and carries at its lower end a valve 75 adapted to close or partially close the chamber 78 which connects with the source of steam supply. A screw 76 is provided with a milled wheel 77 and turns in the end of the beam 60, this screw connecting with the arm 67 so that by adjusting it, the right pressure can be obtained and indicated on the gage 67. Normally the valve 75 will be closed and the steam supply to the turbine will pass from the chamber 53 through the port 54. If, however, the speed of the turbine increases, owing to a light load, the pressure in the chamber 58ᵃ will correspondingly increase, and the valve 56 will be raised so as to partially choke off the steam supply. If, on the other hand, the speed lessens, owing to a heavy load or for lack of steam, the pressure in the chamber 58ᵃ will drop, the piston 58, valve 56, and rod 57 will drop, thus permitting the beam 60 to tilt and the valve 75 to be raised so that the auxiliary steam supply will pour in from the chamber 53 and through the chamber 78 and pipe 78ᵃ to the chamber 48 and to the third bank of rings. In this way I am enabled to run the turbine at a substantially permanent speed and at constant pressure.

It is desirable to have the oil forced to the bearings of the turbine under pressure so that these may be kept properly lubricated, and the arrangement I have shown in Fig. 10 is suitable for this purpose. A casing 79 is provided with a piston 80 having an operating rod 81 connecting with a suitable source of power and working through the stuffing box 82. An oil inlet 83 leads to the casing above the piston, and a duct 84 leads from it and can connect with a pipe as 21 in Fig. 2, to force oil to the turbine bearings. In the lower end of the casing 79 is an inlet 85 for a pressure medium, and this raises the piston 80 and forces out the oil. It will be understood that the inlet pipe connecting with the duct 83 will have a suitable check valve to prevent back pressure, but I have not shown this as it forms no part of my present invention.

While I have shown and described a turbine having three banks of rings, it will be understood that any desired number of these can be used without affecting the invention. It will further be noticed that by arranging the rings in banks and having the pressure regulator constructed so that when extra power is required fresh steam can be supplied to a bank of keys independent of the exhaust from the previous bank, I am enabled to get great power and get it just as specifically described, thus rendering the engine exceedingly economical in operation as it will use only the steam required to maintain a certain speed under a certain load.

Attention is called to the fact that by having the impact and deflecting blades all carried on alternating rings, it is a very simple matter to remove as many rings as may be desired when it is necessary to repair a blade or blades, and attention is also called to the fact that by having the inlet near the center of the cylinder, and the banks of rings arranged on opposite sides of the inlet, as well as diametrically opposite the inlet, a balanced pressure is obtained which makes the turbine run much smoother and with greater efficiency, and also prevents wear. With many types of turbine having several series of blade banks, with the idea of using the steam expansively, the general flow of steam is from one end of the cylinder to the other, so that there is a very decided end pressure which has a tendency to push the whole structure longitudinally, and therefore brings a disadvantageous bearing on one end portion of the machine.

I claim:—

1. A steam turbine comprising a cylinder having a shaft running longitudinally therethrough, banks of stationary and running rings alternating within the cylinder and provided with deflecting and impact blades respectively, the running rings being rigidly connected to the shaft, a dividing flange having ports therethrough rigidly connected to the shaft, an inlet chamber and a movable ring valve arranged in the inlet chamber and having ports to register with the aforesaid flange ports.

2. A steam turbine comprising a cylinder having a suitable steam inlet, a shaft extending longitudinally through the cylinder, and a plurality of alternating stationary and running rings, the latter being rigidly connected to the shaft and the rings being provided respectively with deflecting and impact blades, said rings being arranged in banks, the first bank being on one end of the inlet, the next bank being located substantially opposite the inlet, and the third bank being arranged on the inner side of the inlet, with steam connections leading from the first bank to the second, and from the second to the third respectively.

3. A steam turbine comprising a cylinder having a suitable inlet, a shaft extending longitudinally through the cylinder, a collar keyed to the shaft and having longitudinal steam ways therethrough, a bank of alternating stationary and running rings encircling the collar and provided respectively with deflecting and impact blades, means for conducting steam from said banks of rings to the steam ways of the collar, a second bank of blade rings similar to the first, and means for conducting steam from the steam ways of the collar to the second bank of rings.

4. A steam turbine comprising a cylinder having a suitable steam inlet, a shaft extending longitudinally through the cylinder, a collar keyed to the shaft and provided with longitudinal steam ways or channels, banks of alternating stationary and running rings arranged in series, with the running rings rigidly connected to the collar and shaft, and with the stationary and running rings provided respectively with deflecting and impact blades, means for conducting steam from the first bank of rings to the steam ways in the collar, and from said steam ways to the succeeding bank of rings.

5. A steam turbine comprising a cylinder having a steam inlet, a shaft extending longitudinally through the cylinder, a collar having steam ways longitudinally therethrough, said collar being keyed to the shaft and provided with a flange having steam ports therethrough, a ring valve movable in the inlet and having ports registering with the ports of the aforesaid flange, a bank of alternating stationary and running rings surrounding the collar, with the running rings keyed to the collar, said rings carrying suitable blades, means for conducting steam from the said bank of rings to the steam ways of the collar, and succeeding banks of rings operatively connected with the shaft and receiving their steam supply from the channels of the aforesaid collar.

6. A steam turbine comprising a cylinder having a steam inlet, a shaft extending longitudinally through the cylinder, meeting rings fixed in the cylinder and having a steam inlet chamber between them, a movable valve ring arranged in the said inlet chamber and having ports therethrough, a bank of alternating stationary and running rings arranged within the cylinder and provided respectively with deflecting and impact blades, the running rings being rigidly connected with the shaft, and spacing rings between the stationary rings and between the running rings.

JOHN DIANOVSZKY.

Witnesses:
GEORGE FESKA,
STEPHEN STRCZELLYI.